(12) United States Patent
Shinoda

(10) Patent No.: US 9,273,804 B2
(45) Date of Patent: Mar. 1, 2016

(54) VIBRATION-PROOF CLAMP

(71) Applicant: NEWFREY LLC, Newark, DE (US)

(72) Inventor: Yoshinori Shinoda, Hiroshima (JP)

(73) Assignee: NEWFREY LLC, Newark, DE (US)

( * ) Notice: Subject to any disclaimer, the term of this patent is extended or adjusted under 35 U.S.C. 154(b) by 0 days.

(21) Appl. No.: 14/621,529

(22) Filed: Feb. 13, 2015

(65) Prior Publication Data

US 2015/0233495 A1 Aug. 20, 2015

(30) Foreign Application Priority Data

Feb. 18, 2014 (JP) .................................. 2014-28171

(51) Int. Cl.

| F16L 3/00 | (2006.01) |
|---|---|
| F16L 3/13 | (2006.01) |
| B60R 11/00 | (2006.01) |
| F16F 15/04 | (2006.01) |
| F16L 3/127 | (2006.01) |
| F16L 55/035 | (2006.01) |
| F16B 1/00 | (2006.01) |
| F16L 3/237 | (2006.01) |

(52) U.S. Cl.
CPC . *F16L 3/13* (2013.01); *B60R 11/00* (2013.01); *F16B 1/00* (2013.01); *F16F 15/04* (2013.01); *F16L 3/127* (2013.01); *F16L 3/237* (2013.01); *F16L 55/035* (2013.01); *B60R 2011/0071* (2013.01)

(58) Field of Classification Search
CPC .. B60H 1/0057; B60R 16/0215; B60R 11/00; B60R 2011/0071; F16L 3/13; F16L 3/127; F16L 55/035; F16L 3/237; F16F 15/04; F16B 1/00

USPC ................. 248/49, 68.1, 71, 73; 24/502, 555
See application file for complete search history.

(56) References Cited

U.S. PATENT DOCUMENTS

| 4,614,321 | A | 9/1986 | Andre | |
|---|---|---|---|---|
| 5,535,969 | A * | 7/1996 | Duffy, Jr. ................ | F16L 3/227 24/487 |
| 7,278,190 | B2 | 10/2007 | Fischer et al. | |
| 8,733,709 | B2 | 5/2014 | Meyers et al. | |
| 2002/0011542 | A1* | 1/2002 | Winton, III ........... | F16L 3/1203 248/74.1 |

(Continued)

FOREIGN PATENT DOCUMENTS

| DE | 3602625 C | 3/1987 | |
|---|---|---|---|
| EP | EP 2056419 A2 * | 5/2009 | .......... B60R 16/0215 |
| JP | 60-81304 U | 6/1985 | |

(Continued)

*Primary Examiner* — Gwendolyn Baxter
(74) *Attorney, Agent, or Firm* — Michael P. Leary

(57) ABSTRACT

A vibration-proof clamp includes a clamp body made of hard resin having a holding part and a stud engaging part, and a rubber member that covers the holding part. The holding part has a curved wall for holding an elongated element from below and at least one elastic holding member that extends slanting downward towards a holding space. The rubber member has a rubber curved part that covers the curved wall of the clamp body, and a rubber holding member that covers the elastic holding member. When the elongated element is attached, the elastic holding member can bend inside a holding member space. The rubber member has a rubber curved extension part that curves upward along the outside of the elongated element, and connects with the rubber curved part. This arrangement prevents the elongated element from being in direct contact with the clamp body.

12 Claims, 13 Drawing Sheets

(56) References Cited

U.S. PATENT DOCUMENTS

2003/0136884 A1 * 7/2003 Miura .................. F16B 37/00
                                                                248/68.1
2005/0284989 A1 * 12/2005 Mizukoshi ............ F16L 55/035
                                                                248/65

FOREIGN PATENT DOCUMENTS

JP          EP 1596111 A1 *  11/2005  ......... B60H 1/00557
JP              4171793 B        10/2008

* cited by examiner

VIBRATION-PROOF CLAMP

CROSS-REFERENCE TO RELATED APPLICATIONS

This application claims priority from Japanese Patent Application No. 2014-28171, filed on Feb. 18, 2014, the disclosure of which is incorporated herein by reference.

BACKGROUND OF THE PRESENT INVENTION

The present invention relates to a clamp for holding a long, narrow shaped elongated member such as a pipe, tube or wire harness onto an attaching member such as the body panel or the like of an automobile, in particular, a vibration-proof clamp that neither transmits vibrations from the elongated member such as a pipe, tube or wire harness to an attaching member such as the body panel or the like nor transmits vibrations from the attaching member such as the body panel or the like to the elongated member such as a pipe, tube or wire harness.

A pipe clamp by which a pipe is mounted removably to an attaching member is provided with a clamp part that holds the pipe and a main body part that is fixed on an attaching member such as the body panel of an automobile; the pipe is held by the clamp part and the main body part is fixed to the attaching member. The clamp part has an open portion that receives a pipe on the top and is constructed to accommodate the pipe in a U-shaped space formed by a pair of side walls and a bottom, holding it so that the accommodated pipe does not escape from the clamp part. The main body part has a fixing means for being mounted removably to the attaching member such as a body panel or the like and is fixed to the attaching member such as the body panel of an automobile or the like.

Because of the pulsations of the fluid passing through the interior of the pipe, the pipe will be caused to pulsate. It is necessary to avoid the transmission of such pulsations to the auto body via the pipe clamp. Also, it is necessary that the pulsations of the auto body not be transmitted to the pipe via the pipe clamp.

To accomplish this, pipe clamps exist that are highly vibration-proof and in which the contact surface of the unit holding the pipe is made of rubber or a soft resin. In such pipe clamps, the pipe is not in direct contact with the holding member made of hard resin, and it becomes difficult to transmit the pulsations of the pipe to the auto body. Also, the number of parts is comparatively small. However, as rubber or soft resin is flexible, it stretches easily, and the ability to hold the pipe is inferior to pipe clamps of prior art.

Also, there is a pipe clamp in which the clamp part holding the pipe and main body part fixed on the attaching member are formed by a hard resin. An elastic member made of rubber or soft resin is interposed between the clamp part and the main body part. In such a pipe clamp, it is difficult to transmit pulsations from the pipe part to the main body part. Such a floating type clamp is effective in absorbing pulsations. However, construction becomes complicated, and a problem arises in that it is difficult to combine the soft elastic member with the hard clamp part and the main body part.

The vibration-proof clamp of the floating type has a complicated construction and tends to have a large number of components. Due to insert molding or dichroic molding, a molding machine for insert molding or dichroic molding and a die are necessary.

Patent Document 1 discloses a vibration-proof clamp that provides a twofold construction of a main body part from a hard member of a shape in which an insertion aperture opens and a vibration-proof part that has a holding body that is formed with a soft member and grasps the tube body. The main body part, with a pressing force from the tube body passing through the insertion aperture, has a retaining member that is bent. The holding body of the vibration-proof part, as it joins with the inner wall of the main body part, sets up the separation of a cavity part on the main body part and holds the tube part by fitting.

Inasmuch as the vibration-proof clamp of Patent Document 1 forms a cavity between the main body part and the holding part, it can effectively control the transmission of vibrations and increase its resistance to vibration. However, regarding the vibration-proof clamp of Patent Document 1, because the main body part is set in a mold, followed by injecting and solidifying resin to form the holding body, i.e. because of insert molding or dichroic molding, a molding machine for insert molding or dichroic molding and a die are necessary.

Also, the pipe (tube body), in general, uses a pipe assembly automated machine and imposes the pipe into the vibration-proof clamp. Since the holding body is made of a soft member, it will be difficult for the pipe to slide; there is a cavity directly under it, and it is of concern that the holding body will be stretched and fracture, or will peel off from the main body part made of hard resin.

Patent Document 2 discloses a grommet having a main body that has an attaching concave part for attaching and holding a linear held body such as a pipe, and a fixed member that supports a main body and fixes it in a prescribed position. The holding contact part of the main body is insulated with a thin-layered cushion. The holding body is protected from vibrations, and deterioration of the attaching concave part is prevented.

However, the cushion covering of the grommet of Patent Document 2 is thin-layered, and sufficient resistance to vibration cannot be expected since there is no space between the holding contact part of the main body and the thin-layered cushion.

Another problem is that it takes a long time to assemble, since after the first formation of the main body, there is required to be a second formation of the cushion layer with a thermoplastic elastomer, or it is necessary to attach the cushion layer to the main body.

Patent Document 3 discloses a pipe support device that is composed of a curved holding part having spring elasticity and a supplementary clip part that is squeezed into the middle of the curved holding part. The curved holding part is formed in a U-shape, and support arms are attached obliquely from the top of the side wall. The supplementary clip part is shaped to open upward and is made of a material having rubber elasticity. The curved side wall of the supplementary clip part is pressed down by the end of the support arm of the curved holding part. Also, there is an engaging protrusion element to engage with the curved holding part.

With the pipe supporting device of Patent Document 3, the side wall of the supplementary clip part is curved more to go along the outer diameter of the pipe and is held by the support arm. Should there be a strong force from the outside, it is of concern that the pipe can slip out of the supplementary clip part. Also, resistance to vibration is not sufficient because no space is provided in the supplementary clip part.

For these reasons, a vibration-proof clamp is needed that has a small number of vibration-proof clamp construction parts, that can be assembled easily by hand and that can be made by using an ordinary injection molding machine without using a molding machine for insert molding or dichroic molding and a complicated die. Furthermore, a satisfactory vibration-proof clamp is needed with the capability to hold a pipe.

PRIOR ART DOCUMENTS

Patent Document 1: JP H 11-336717
Patent Document 2: JP Utility Model S 60-81304
Patent Document 3: JP S 60-249787

SUMMARY OF THE PRESENT INVENTION

An object of the present invention is to provide a vibration-proof clamp that has few component parts, the components of which can be easily assembled by hand and can be molded without using a molding machine for insert molding or dichroic molding and a die.

A particular object of the present invention is to provide a vibration-proof clamp having sufficient resistance to vibration and sufficient strength to hold an elongated member.

In the present invention, a clamp body made of hard resin for holding an elongated member such as a pipe or tube, and a rubber or resilient member made of rubber or soft resin that covers the clamp body, are molded separately; the rubber member is made to cover the main body of the clamp by hand so that the elongated member is only in indirect contact with the clamp main body via the rubber member.

One aspect of the present invention is a vibration-proof clamp for holding an elongated member, including a clamp body made of hard resin and having a holding part, in which at least one holding space is formed for holding the elongated member, and an engaging part to engage the holding part with an attaching member. The vibration-proof clamp further includes a rubber or resilient part made of rubber or soft resin which covers the holding part of the clamp body so that the elongated member and clamp body are not in direct contact. The holding part of the clamp body has a curved wall for holding the elongated member from below and at least one elastic holding member that extends slanting downward towards the holding space to hold the elongated part from above. The rubber member has a rubber curved part that covers the curved wall of the clamp body, a rubber holding member that covers the elastic holding member and a rubber curved extension part that curves upwards along the outside of the elongated member between the rubber curved part and the rubber holding member. The part holding the elongated member is completely covered by the rubber member, and the elongated member does not contact the clamp body.

The curved wall of the holding part of the clamp body is covered by the rubber curved part of the rubber member, and the elastic holding member is covered by the rubber holding member. Because the elongated member is not in direct contact with the clamp body, a vibration-proof clamp with high resistance to vibration can be obtained.

Because it has at least one elastic holding member in the one holding space, after the elongated member is mounted, it can be held with stability in the holding space by the elastic holding member.

Also, the rubber member between the rubber curved wall and the rubber holding member has a rubber curved extension part that curves upwards along the outside of the elongated member. Inasmuch as the end of the rubber curved extended part is connected with the rubber holding member, the rubber member holds the elongated member around its circumference, and the elongated member is not in contact with the clamp body.

On the underside of the elastic holding member, a holding member space is formed. When the elongated member is pushed into the holding space, it is preferred that at least one elastic holding member can bend inside the holding member space.

Because a holding member space is formed on the underside of the elastic holding member, when the elongated member is pressed into the elastic holding member, the elastic holding member can bend into the holding member space and the elongated member can be mounted in the holding space. The elastic holding member returns to its original shape, the elongated member is pressed down slantwise from above and the elongated member is held so that it does not escape from the holding space.

It is preferable to have a pair of elastic holding members that extend slanting downward toward the holding space. If a pair of elastic holding members is provided for the one holding space, the elongated member can be controlled from above on the left and right, and the elongated member can be held with more stability.

It is also desirable to have one elastic holding member and a bulge on the opposite side of the elastic holding member of the holding space. Even with one elastic holding member, the elastic holding member and the bulge work together to hold the elongated member so that it does not escape.

It is desirable that the clamp body have protrusions on the top, and the rubber top part of the rubber member have mating protrusion holes into which are seated the protrusions on the rubber top part. Thus, when the elongated member is attached, the rubber holding member of the rubber member is held so that it does not move in relation to the elastic holding member of the clamp body. When the protrusions of the clamp body are thus seated into the protrusion holes of the rubber member, the rubber holding member can be held so that it does not move in relation to the elastic holding member of the clamp body. Wherefore, the elongated member is pressed into the holding space and it is difficult for the rubber holding member to slip.

It is desirable that the clamp body have an engaging bar extending transversely along the clamp body on the bottom part of the holding part, and that the rubber side wall of the rubber member have engaging bar holes for seating the ends of the engaging bar; both ends of the engaging bar are seated in engaging bar holes and the rubber member is held so that it does not become detached from the clamp body. If the engaging bar is seated in the engaging bar holes, the rubber member can be prevented from slipping up or sideways from the clamp body.

It is desirable to have a plurality of engaging bars and respective mating engaging bar holes into which are seated the ends of the respective engaging bars. Because of this, the holding member can be reliably prevented from slipping from the clamp body.

According to the present invention, a vibration-proof clamp can be provided that has sufficient vibration-proof efficiency and is sufficiently strong to hold an elongated member such as a pipe or tube. Furthermore, according to the present invention, a vibration-proof clamp can be provided that can be molded in a simple manner without using a molding machine for insert molding or dichroic molding and a die. Also, according to the present invention, a vibration-proof clamp can be provided in which the component parts can be assembled simply without using assembly tools.

DETAILED DESCRIPTION OF THE PREFERRED EMBODIMENTS

A vibration-proof clamp 1 according to a first embodiment of the present invention will be described below, with reference to the drawings. The vibration-proof clamp 1 holds a pipe or the like and is provided with a clamp body 10 made of a hard resin for mounting to a stud and a rubber or resilient member 30 made of soft resin or rubber for covering the clamp body 10.

First, in reference to FIGS. 1-6, the clamp body 10 will be described. Next, in reference to FIGS. 7-13, the rubber member 30 will be described. Then, in reference to FIGS. 14-15, the procedure for assembling the clamp body 10 and the rubber member 30 will be described.

Thereafter, in reference to FIGS. 16-19, the assembled vibration-proof clamp 1 will be described. Then, in reference to FIGS. 20-22, the holding process for inserting and holding the pipe into the vibration-proof clamp 1 will be described. Finally, in reference to FIG. 23, the vibration-proof clamp 1 that is holding the pipe will be described. In the description of the first embodiment of the present invention, the up-and-down direction is the up-and-down direction of FIG. 17; the lateral direction is the direction of the perpendicular angle with the pipe (lateral direction of FIG. 17); and the transverse direction is the direction parallel to the pipe (lateral direction of FIG. 18).

Figure 1:
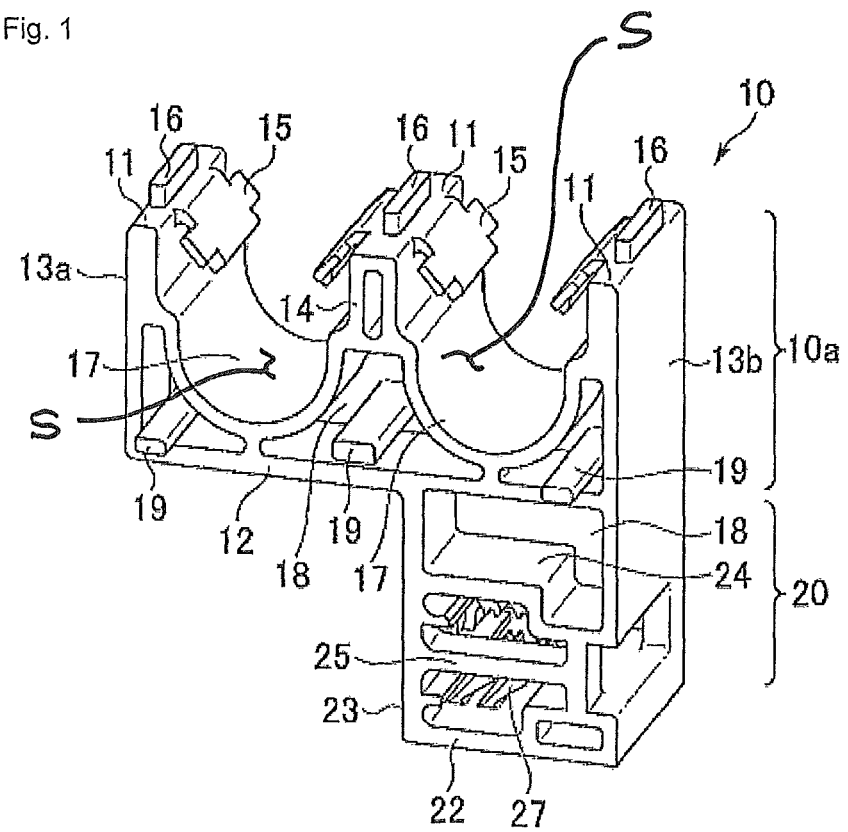
FIG. 1 is an oblique view of the clamp body of the vibration-proof clamp according to a first embodiment of the present invention.
Figure 2:
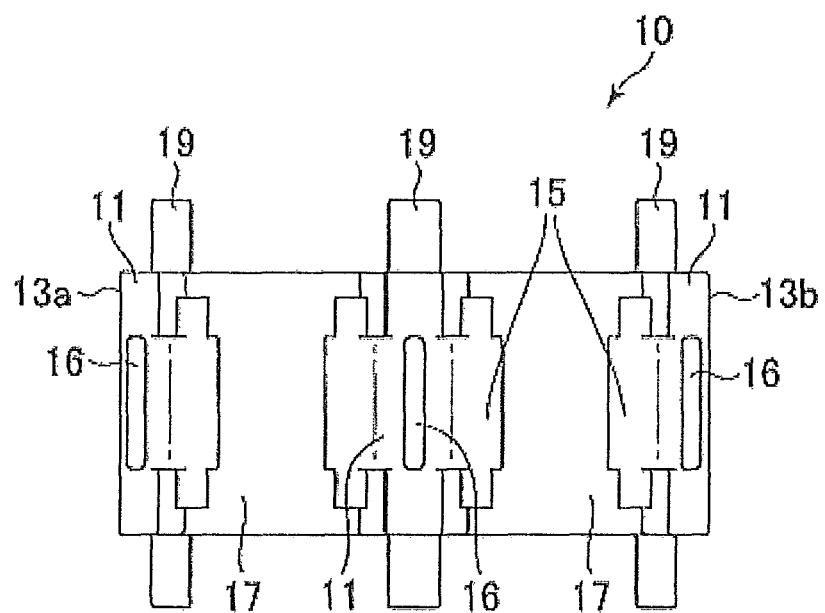
FIG. 2 is a top view of the clamp body of FIG. 1.
Figure 3:
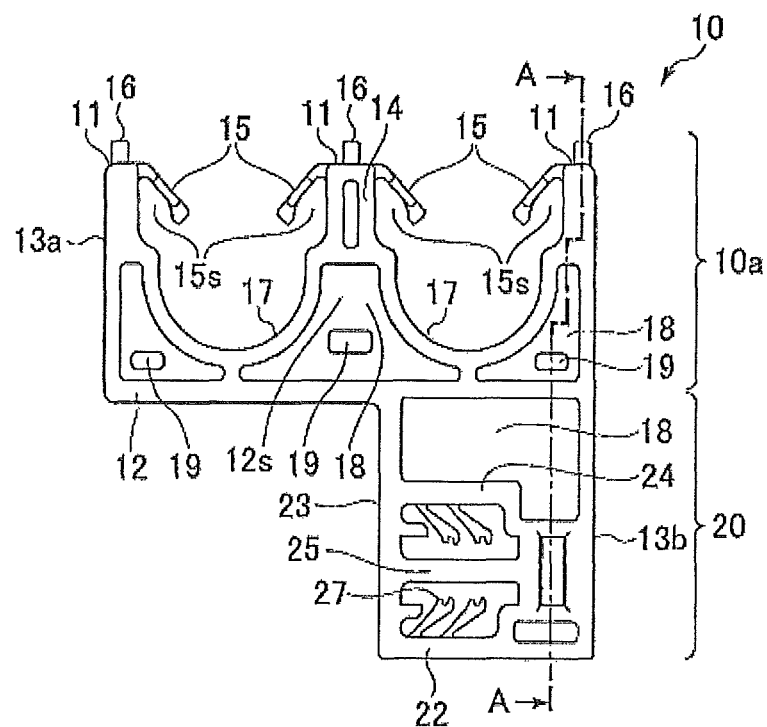
FIG. 3 is a front view of the clamp body of FIG. 1.
Figure 4:
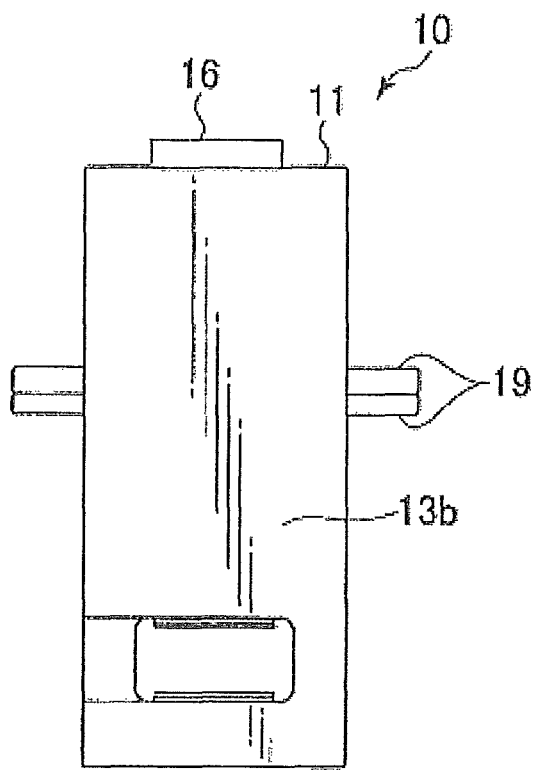
FIG. 4 is a right side view of the clamp body of FIG. 1.
Figure 5:
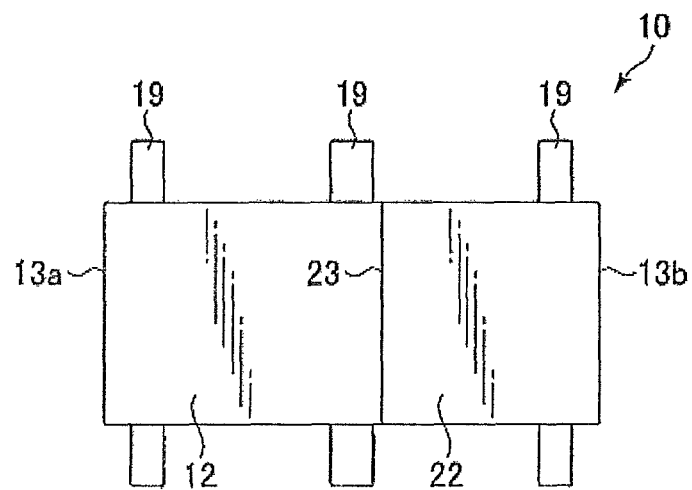
FIG. 5 is a bottom view of the clamp body of FIG. 1.
Figure 6:
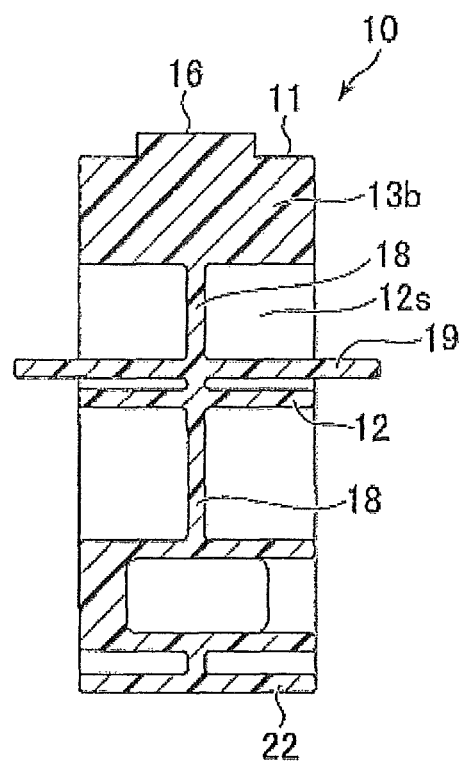
FIG. 6 is a cross-sectional view of the clamp body of FIG. 1 along the A-A line of FIG. 3.

FIG. 1 is an oblique view of the clamp body 10. FIG. 2 is a top view; FIG. 3 a front view; FIG. 4 a right side view; and FIG. 5 is a bottom view. FIG. 6 is a cross-sectional view of the clamp body of FIG. 1 along line A-A of FIG. 3.

The clamp body 10 is made with a hard resin such as polyacetal resin (POM). The clamp body 10 is provided with a holding part 10a that holds various pipes such as fuel pipes and brake fluid pipes, etc., and with an engaging part 20 arranged below the holding part 10a and fixed on a stud (not shown in the figure) set up on the body panel.

In order to hold pipes, the holding part 10a of the clamp body of a first embodiment of the present invention is provided with two holding spaces S (FIGS. 1, 17-25), in which two pipes P (FIGS. 21-23) can be mounted. The number of mounted pipes P is not limited. The number of holding spaces S may also be just one or even three or more.

The holding part 10a has a bottom base 12. An end wall 13b extends upward from one end of the base 12. The end wall 13b is also connected to an engaging part 20, which extends downward from the holding part 10a. An end wall 13a extends upward from another end of the base 12. The end wall 13a does not extend to the engaging part 20 below. Between the two end walls 13a, 13b, a central wall 14 extends upward. From the top of the end walls 13a, 13b, elastic holding members 15 extend slanting downward toward the holding space S into which the pipe P is set. The elastic holding members 15 also extend slanting downward toward the left and right holding space S from the central wall 14. The downward-slanting elastic holding members 15 hold the pipe P that is set into the holding space S.

As shown in FIG. 3, holding member spaces 15s are formed under the elastic holding members 15, that is between the elastic holding member 15 and the end wall 13a and between the elastic holding member 15 and the end wall 13b. Holding member spaces 15s are also formed between the elastic holding members 15 and the central wall 14. When the pipe P is mounted, the elastic holding members 15 being pressed by the pipe P bend inside the holding member spaces 15s, and the pipe P is squeezed into the holding space S.

The upper ends of the end walls 13a, 13b are level tops 11, and protrusions 16 are formed on top of the level tops 11. On the top 11 of the central wall 14, a protrusion 16 is also formed. The protrusions 16 have a rectangular shape having a long dimension in the transverse direction. The protrusions 16 fit into mating protrusion holes 36 of the rubber element 30 to be discussed below (see FIG. 7).

On both sides of the central wall 14 above the base 12, curved walls 17 that curve in a semi-circular cylindrical shape are formed corresponding to the radius of the pipe P in order to support the pipe from below. The top ends of the two curved walls 17 are continuous with the lower end of the central wall 14.

Above the curved wall 17 is the holding space S into which the pipe P is set. The number of holding spaces S, and their respective sizes and shapes, can be selected arbitrarily to conform with the pipe P that is being held.

As shown in FIG. 6, which is a cross-sectional view of line A-A of FIG. 3, between the curved wall 17 and the base 12, there is a barrier wall 18 that extends laterally at the transversal center part of the clamp body 10.

As shown in FIG. 2, which is a front view, and FIG. 6, which is a cross-sectional view of line A-A of FIG. 3, three engagement bars 19 extend out of the barrier wall 18 down from a position near the end walls 13a, 13b and the central wall 14. The engagement bars 19 extend from the barrier wall in a transverse direction in relation to the clamp body 10, and they end a little beyond the width of the end walls 13a, 13b and the central wall 14. The engagement bars 19 fit into mating engagement bar holes 39 of the rubber member 30 to be discussed below and hold the rubber member 30 so that it does not slip.

As shown in FIG. 3, the engaging part 20 for mounting on a stud is disposed under part of the base 12 of the clamp body 10. The position, construction, etc. of the engaging part 20 can be modified in accordance with the conditions of the studs, the body panel, etc. to which it is mounted. In the first embodiment of the present invention, an end wall 23 extends under the base 12, and the other end wall 13b on the other side continues from the holding part 10a. A bottom 22 extends between the lower end of the end wall 23 and the lower end of the end wall 13b. Between the bottom 22 and the base 12, a central wall 24 extends transversely. The barrier wall 18 is also provided laterally in the center between the base 12 and the central wall 24. On both sides along the width of the barrier wall 18 between the base 12 and the central wall 24, there are spaces. Along the width between the bottom 22 and the central wall 24, two rims 25 extend horizontally.

Two engagement claws 27 extend slanting downward from the bottom of the central wall 24 to engage with the thread ridge of the stud. From the topside of the bottom 22, two engagement claws 27 extend slanting upward. The space that is surrounded by the engagement claws 27 and the rim 25 is a stud space for receiving studs. The number, construction, etc. of engagement claws 27 can be modified in accordance with the condition of the studs to which they are mounted.

The means for mounting the clamp body 10 to the body panel, etc. is not limited to engagement with a stud by an engagement claw 27. The clamp body 10 can be mounted to the body panel, etc. of a vehicle frame by other known means such as an anchor foot clip.

Figure 7:
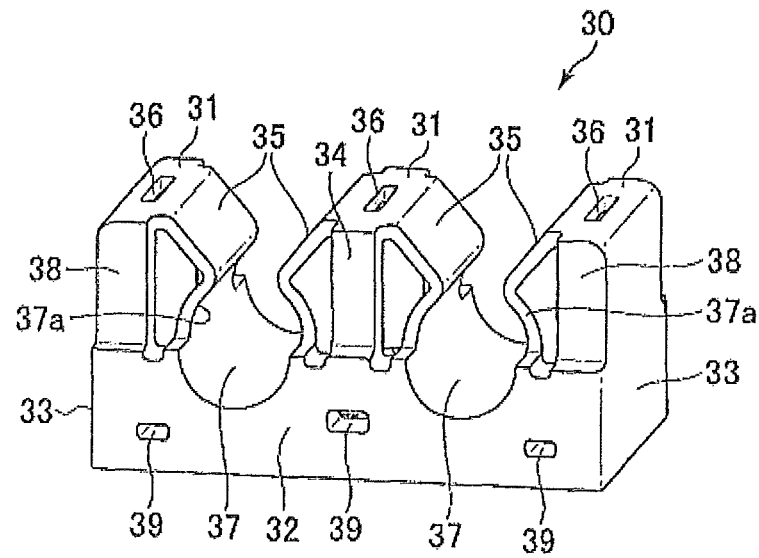
FIG. 7 is an oblique view of the rubber member of the vibration-proof clamp according to the first embodiment of the present invention.
Figure 8:
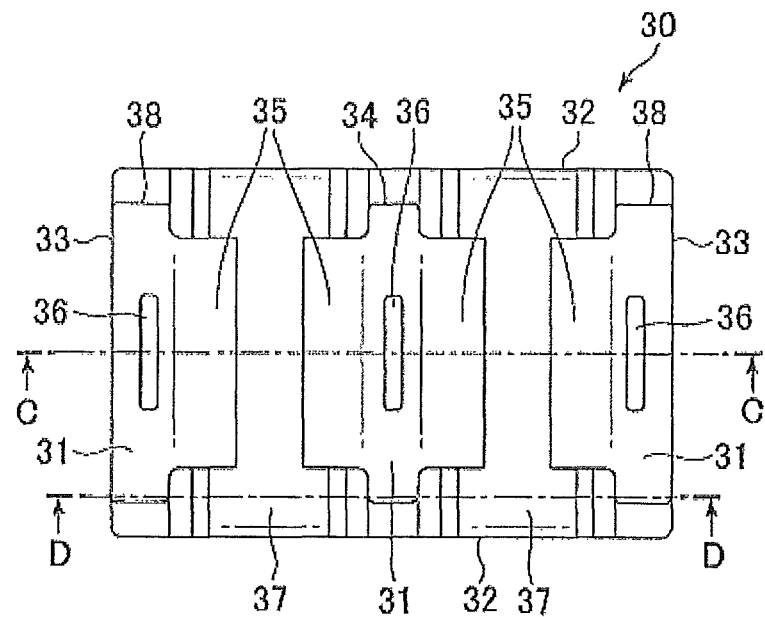
FIG. 8 is a top view of the rubber member of FIG. 7.
Figure 9:
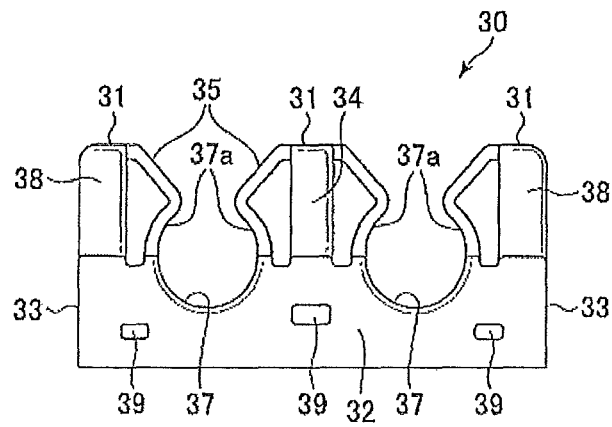
FIG. 9 is a front view of the rubber member of FIG. 7.
Figure 10:
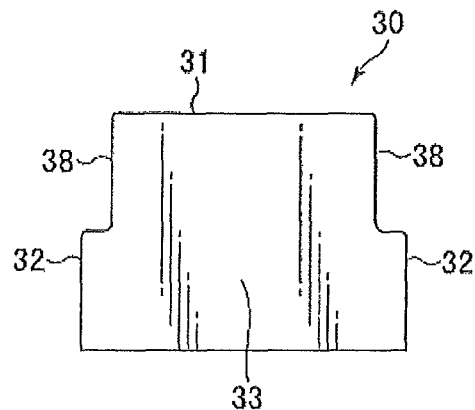
FIG. 10 is a left side view of the rubber member of FIG. 7.
Figure 11:
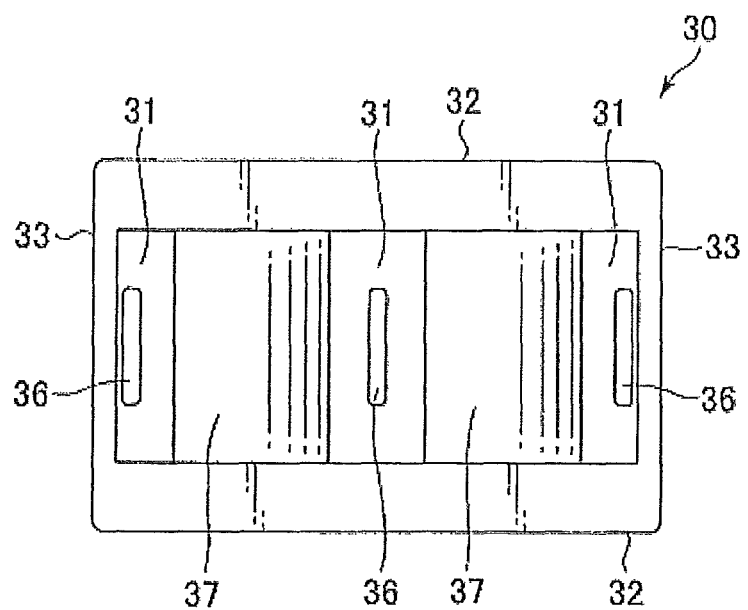
FIG. 11 is a bottom view of the rubber member of FIG. 7.
Figure 12:
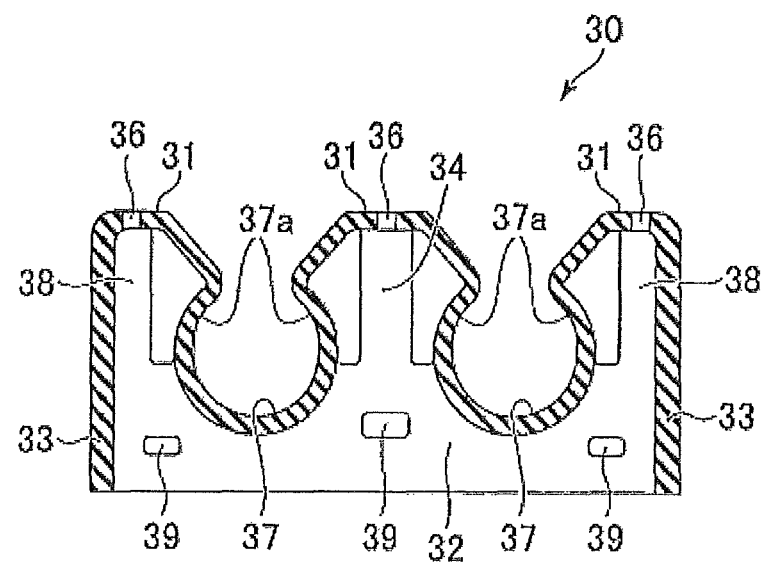
FIG. 12 is a cross-sectional view of the rubber member of FIG. 7 along line C-C of FIG. 8.
Figure 13:
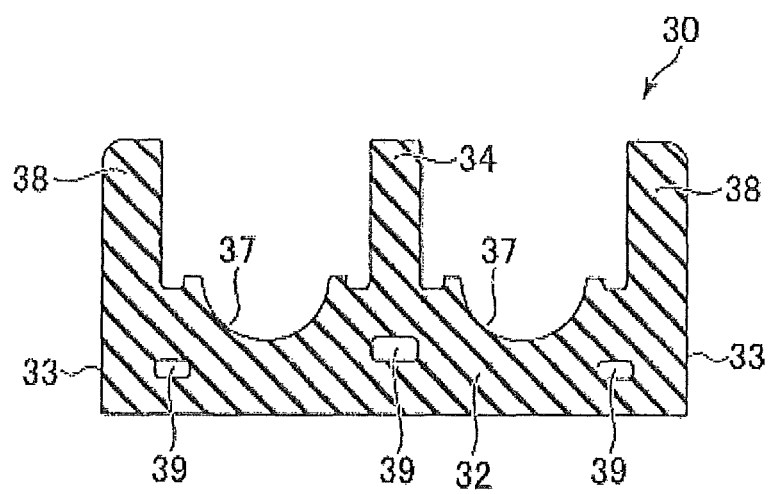
FIG. 13 is a cross-sectional view of the rubber member of FIG. 7 along line D-D of FIG. 8.

FIG. 7 is an oblique view of the resilient or rubber member 30 of the vibration-proof clamp 1. FIG. 8 is a top view, FIG. 9 is a front view, FIG. 10 is a left side view and FIG. 11 is a bottom view. FIG. 12 is a cross-sectional view along line C-C of FIG. 8 of the rubber member of FIG. 7. FIG. 13 is a cross-sectional view along line D-D of FIG. 8 of the rubber member of FIG. 7.

The rubber member 30 is a one-piece unitary member that covers the clamp body 10 and is interposed between the pipe P and the clamp body 10 (as in FIG. 14) so that the pipe P and the clamp body 10 are not in direct contact. The rubber member 30 is nearly identical to the shape of the holding part 10a of the clamp body 10. The lower part of the rubber member 30 defines a bottom aperture 29 (see FIG. 14) so that it can cover the clamp body 10. The transverse end of the rubber member 30 is a rubber or resilient side wall 32. On one side wall 32, three holes 39 for engagement bars are formed for seating the ends of the engagement bars 19 of the clamp body 10. The cross-sectional shape of the engagement bar holes 39 is nearly identical to the cross-sectional shape of the engagement bars 19, and the engagement bars 19 can thus be seated into them.

As shown in FIGS. 10 and 11, the thickness of the rubber side wall 32 is wider that the thickness of a rubber or resilient end wall 38. The thickness of the rubber side wall 32 is nearly equal to the length of the engagement bar 19 protruding from the transverse end of the clamp body 10, and the engagement bar 19 of the clamp body 10 can be seated into the engagement bar hole 39. By seating the engagement bar 19 into the engagement bar hole 39, the rubber member 30 is fixed reliably into the clamp body 10. The top part of the rubber member 30 may be changed but rubber side wall 32 is difficult to change because of its thickness.

As shown in FIGS. 7 and 9, a rubber or resilient central wall 34 is formed above the lateral center part of the rubber side wall 32 of the rubber member. The rubber central wall 34 covers the transverse end of the central wall of the clamp body 10. Rubber end walls 38 are formed above respective lateral end parts of the rubber side walls 32 of the rubber member 30. The rubber end walls 38 cover the transverse end parts of the end walls 13a, 13b.

As shown in FIG. 7, the lateral ends of the rubber member 30 are rubber or resilient end walls 33 that cover the end walls 13a, 13b of the clamp body 10. Continuing to the top of the rubber end walls 33, there is a level rubber top 31. The rubber top 31 covers the top 11 of the clamp body 10. The rubber top 31 is also provided on the top end of the rubber central wall 34 of the rubber member 30. On the respective rubber tops 31, protrusion holes 36 are formed that receive the protrusions 16 of the clamp body 10. The protrusions holes 36 are of a shape that is appropriate to the exterior shape of the protrusions 16.

Figure 22:
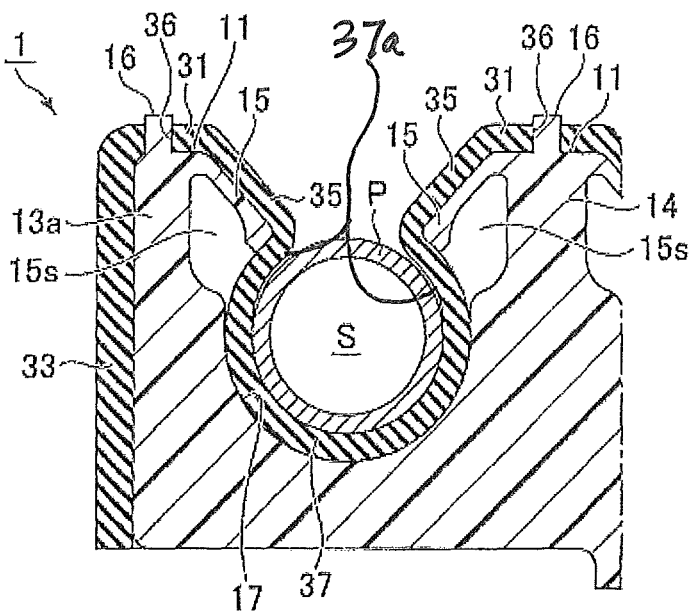
FIG. 22 is an enlarged cross-sectional view after mounting the pipe into the vibration-proof clamp of FIG. 15.

Rubber holding members 35 extend slanting downward from the rubber tops 31. The rubber holding members 35 cover the elastic holding members 15 of the clamp body 10. Also, a rubber curved part 37 is provided of a semicircular shape appropriate to the external shape of the pipe P. The rubber curved part 37 covers the curved wall 17 of the clamp body 10 and contacts the pipe P that is mounted. As shown in FIGS. 12 and 22, the rubber curved part 37 runs along outer diameter of the set-in pipe P, extends to curve above the curved wall 17, becomes a rubber curved extension 37a and continues to the end of the rubber holding member 35 (FIG. 7).

Figure 14:
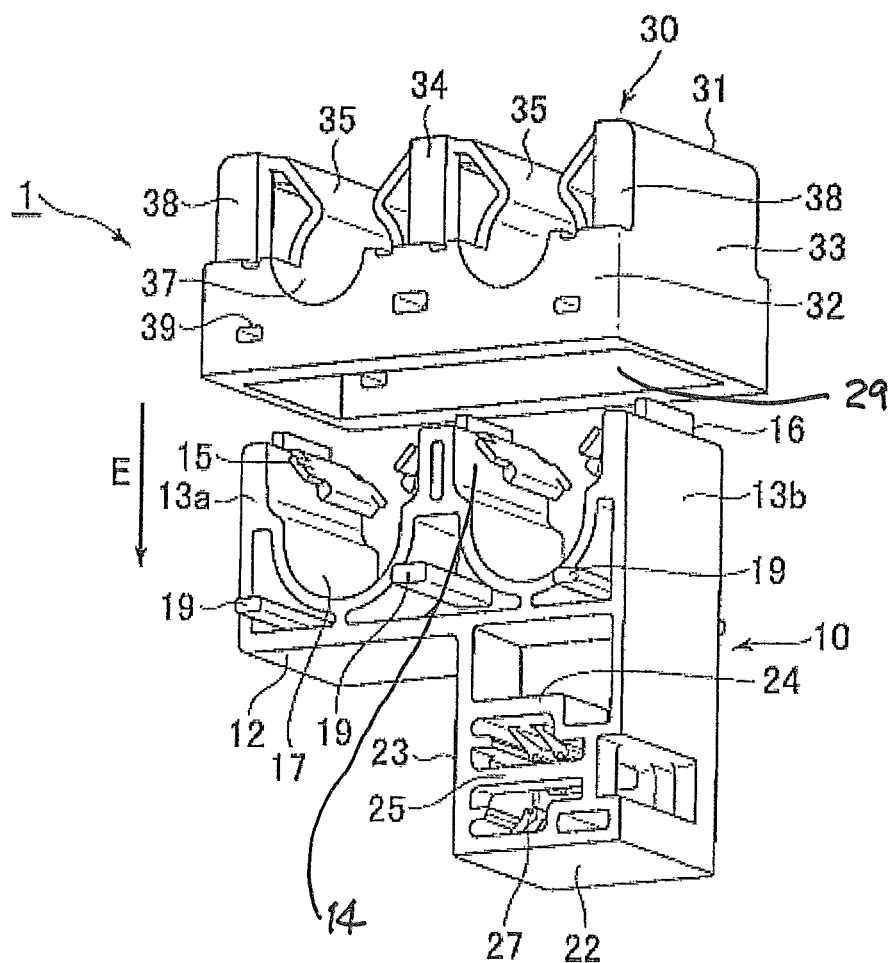
FIG. 14 is a pre-assembly oblique view of the clamp body of FIG. 1 and the rubber member of FIG. 7.
Figure 15:
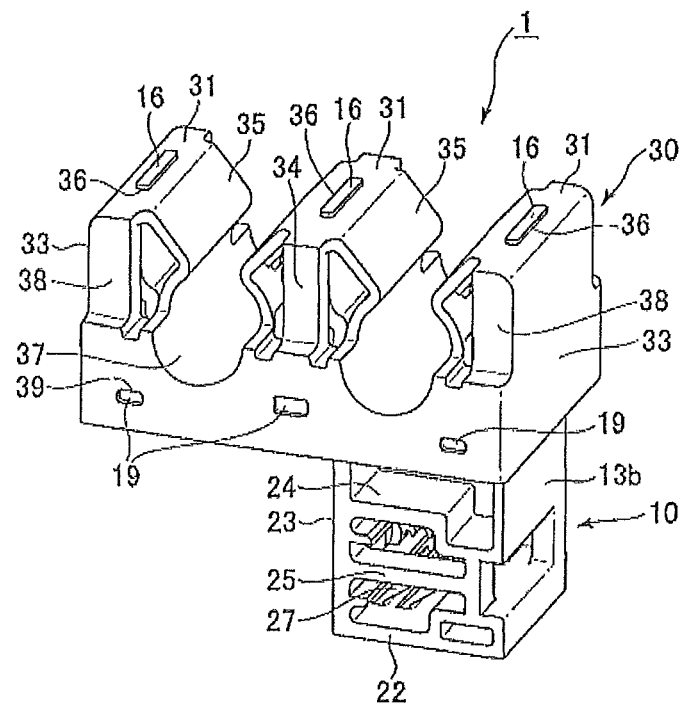
FIG. 15 is a post-assembly vibration-proof clamp of the present invention upon assembly of the clamp body of FIG. 1 and the rubber member of FIG. 7.

With reference to FIGS. 14 and 15, covering of the clamp body 10 with the rubber member 30 and the assembly process of the vibration-proof clamp 1 are described. FIG. 14 is an oblique view of the pre-assembly of the clamp body 10 and the rubber member 30. FIG. 15 is an oblique view after the vibration-proof clamp 1 is made by assembling the clamp body 10 and the rubber member 30.

As shown in FIG. 14, the rubber member 30 is disposed above the clamp body 10, with the clamp body 10 being disposed below the aperture 29, and the rubber member 30 is moved down as shown by the arrow E. The end walls 13a, 13b are sandwiched between the rubber end walls 33, and the central wall 14 is disposed between the two rubber central walls 34 which face the central wall 14 transversely, and the rubber member 30 is moved further downward. The upper parts of the opposing rubber curved parts 37 are placed in the space and pass between the pair of elastic holding members 15.

As shown in FIG. 15, the rubber holding members 35 of the rubber member 30 abut on the elastic holding members 15 of the clamp body 10, and the rubber curved parts 37 abut on the curved walls 17. The protrusions 16 of the clamp body 10 are seated into the protrusion holes 36 of the rubber member 30. In this way, the rubber member 30 becomes difficult to move vis-à-vis the clamp body 10.

The rubber side wall 32 is then extended or stretched transversely, so that the engagement bars 19 of the clamp body 10 are seated into the engagement bar holes 39 of the rubber member 30. This is yet another way to fix the rubber member 30 so that it is difficult to be separated from the clamp body 10. Thus, with the assembly of the clamp body 10 and rubber member 30, the vibration-proof clamp 1 is realized.

Figure 19:
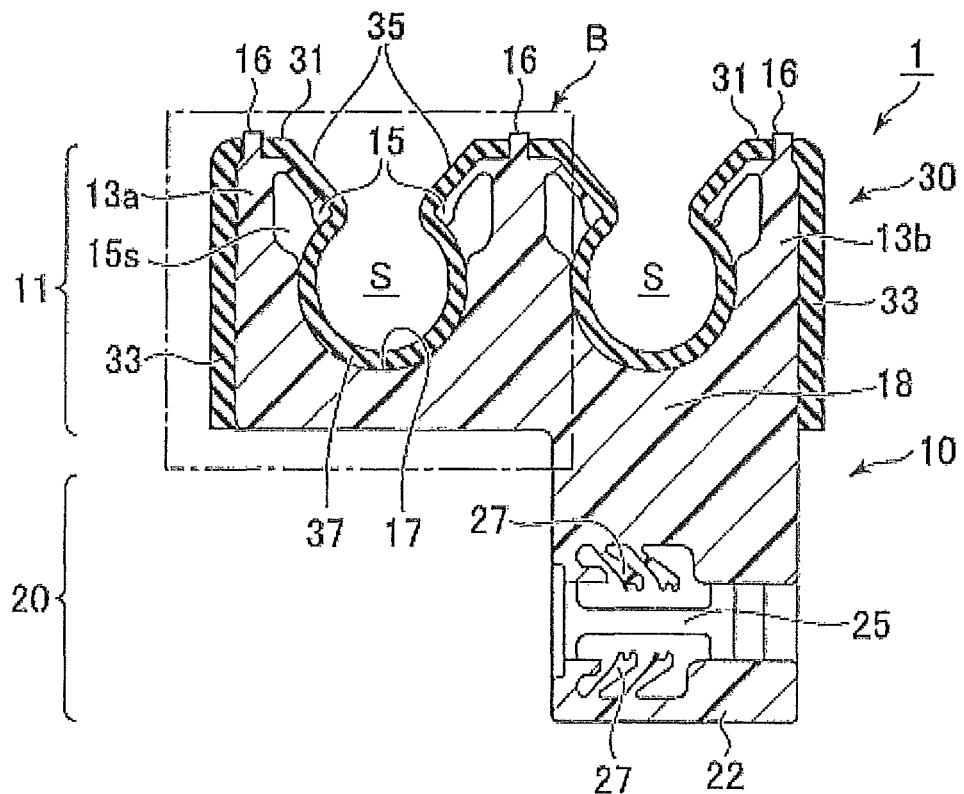
FIG. 19 is a cross-sectional view of the vibration-proof clamp of FIG. 15 along the A-A of FIG. 16.
Figure 21:
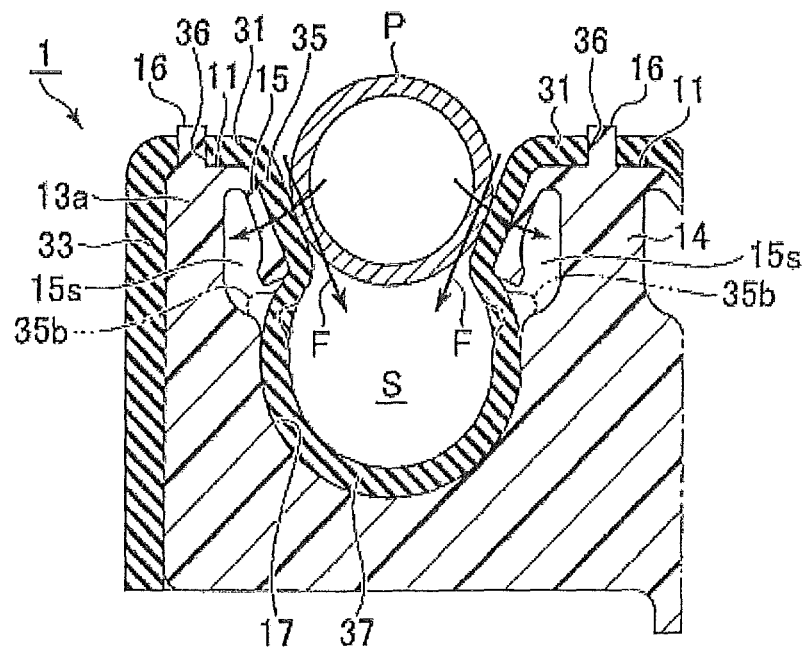
FIG. 21 is an enlarged cross-sectional view of the intermediate stage of inserting the pipe into the vibration-proof clamp of FIG. 15.

With respect to FIG. 19, holding member spaces 15s are formed under the elastic holding members 15. As shown in FIGS. 21 and 22, when the pipe P is mounted, the respective opposing rubber holding members 35 and the elastic holding members 15 are pressed by the pipe P, thus expanding spaces S, and, as holding members 15 enter the holding member spaces 15s, the pipe P can be inserted.

Figure 16:
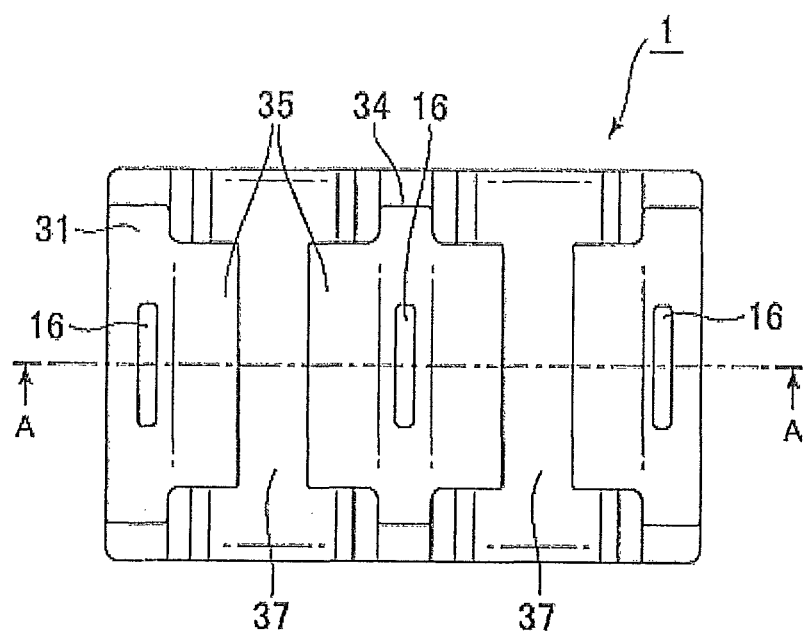
FIG. 16 is a top view of the vibration-proof clamp of FIG. 15.
Figure 17:
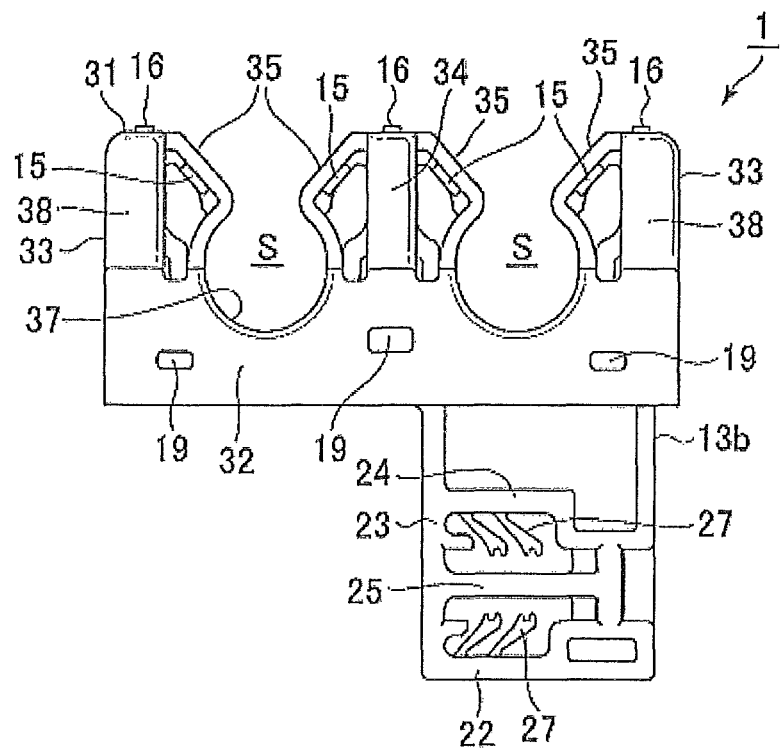
FIG. 17 is a front view of the vibration-proof clamp of FIG. 15.
Figure 18:
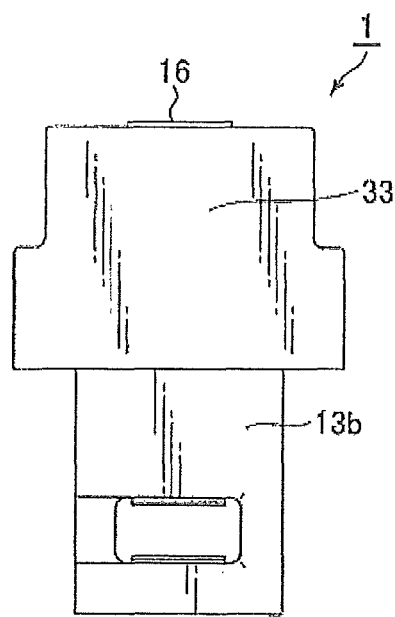
FIG. 18 is a right side view of the vibration-proof clamp of FIG. 15.

FIG. 16 is a top view of the clamp body 10 and the vibration-proof clamp 1 of FIG. 15 with the rubber member 30 assembled, FIG. 17 is a front view, and FIG. 18 is a right side view. FIG. 19 is a cross-sectional view of the vibration-proof clamp 1 along line A-A of FIG. 16. As particularly as shown in FIG. 19, the rubber end walls 33 of both lateral ends of the rubber member 30 are in contact with the end walls 13a, 13b of the clamp body 10. The rubber holding members 35 are in contact with the elastic holding members 15. The rubber curved parts 37 are in contact with curved walls 17. As shown in FIG. 17, the protrusions 16 of the clamp body 10 are seated into the protrusion holes 36 of the rubber member 30. The engagement bars 19 are seated in the engagement bar holes 39.

Figure 20:
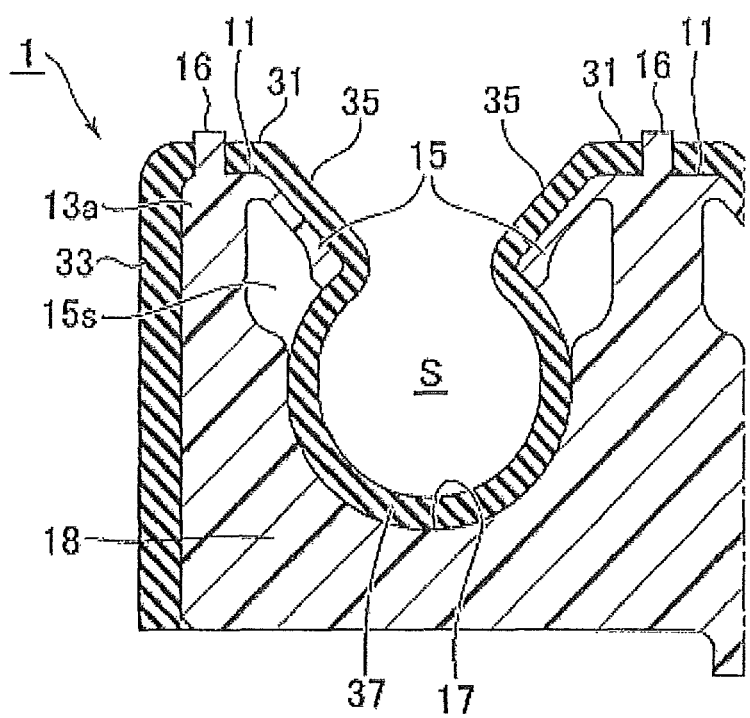
FIG. 20 is an enlarged cross-sectional view of part B of FIG. 19.

With reference to FIGS. 20-22, which are enlargements of the parts in which the pipe P is mounted, the movement of the vibration-proof clamp 1 when the pipe is mounted into the vibration-proof clamp 1 of the first embodiment of the present invention will be described in more detail. FIG. 20 is an enlarged cross-sectional view of B which is a part of the holding part 10a of FIG. 19. FIG. 21 is an enlarged cross-sectional view of the intermediate stage of the partial insertion of the pipe into the vibration-proof clamp 1 and the slight changes of the rubber holding member 35 and the elastic holding member 15. FIG. 22 is an enlarged cross-sectional view after the pipe is mounted into the vibration-proof clamp 1.

As shown in FIG. 21, when the pipe P is mounted into the holding space S, it abuts on the opposing pair of rubber holding members 35. The diameter of the pipe P is larger than the distance between the lower ends of the opposing rubber holding members 35, and the pipe P is held from below by the rubber holding members 35. The rubber holding members 35 are supported from below by the elastic holding members 35.

From the arrangement in FIG. 21, the pipe P is then inserted even more downward. The opposing rubber holding members 35 and the elastic holding members 15 will be pushed to the left and right, respectively, by the pipe P. In the vibration-proof clamp 1 up to now, the rubber holding member 35 is being pushed by the pipe P, and it is easy for it move downward as shown by the arrow F along elastic holding member 15. As it is moving downward, the rubber holding member 35 easily squeezes into the holding member spaces 15s behind the elastic holding members 15. When the rubber holding member 35 has moved into the holding member spaces 15s, bending of the elastic holding member 15 is blocked, and resistance becomes great as the pipe P is squeezed into the holding space S.

In the vibration-proof clamp 1 of the first embodiment of the present invention, it is difficult for the rubber holding members 35 to move up and down vis-à-vis the elastic holding members 15, because the protrusions 16 of the clamp body are seated in the protrusion holes 36 of the rubber member 30. Therefore, without the rubber holding members 35 moving down on the elastic holding members 15 very much, they will be pushed apart by the pipe P. Consequently, the rubber holding members 35, as shown by 35b (in phantom, in FIG. 21), are squeezed into the holding member spaces 15s behind the elastic holding members 15.

When the pipe P passes the lower ends of the rubber holding members 35 and the elastic holding members 15, it enters into the holding space S, as shown in FIG. 22. The elastic holding members 15 return to their original unbent condition, the space between the opposing elastic holding members 15 becomes narrow again, and both the rubber holding members 35 and the elastic holding members 15 have a narrow space in which to move. The pipe P is pressed in a direction slanting downward by the rubber holding members 35 and the elastic holding members 15, and is prevented from being dislodged.

The rubber curved extension part 37a between the rubber curved part 37 and the rubber holding member 35 is in slanting upward contact towards the pipe P (See also FIG. 12). The pipe P is held wrapped around by the rubber curved part 37 and the rubber curved extension part 37a.

When the pipe P is mounted as in FIG. 22, the pipe P and clamp body 10 are not in direct contact, because the rubber member 30 is interposed between the pipe P and the clamp body 10. The rubber holding members 35 of the rubber member 30 are interposed between the pipe P and the elastic holding members 15. When the pipe P is inserted, it is difficult for the rubber holding members 35 to move vis-à-vis the elastic holding members 15, because the protrusions 16 are seated in the protrusion holes 36 of the rubber member 30.

Figure 23:
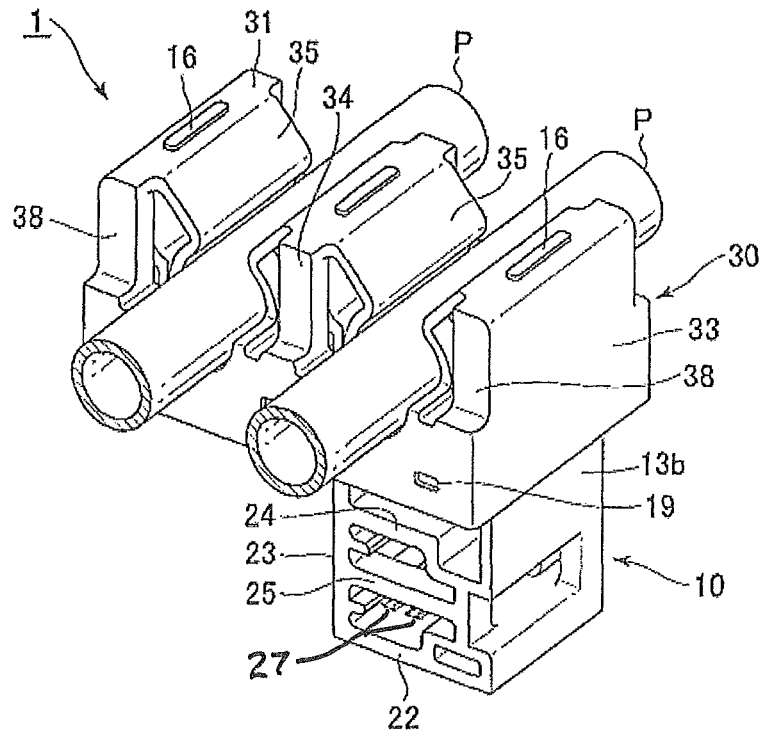
FIG. 23 is an oblique view showing the situation in which two pipes are mounted in the vibration-proof clamp of FIG. 15.

FIG. 23 is an oblique view showing the situation in which pipes P have been mounted in the vibration-proof clamp 1. By engaging the engagement claws 27 of the stud engagement parts 20 of the clamp body, the vibration-proof clamp is mounted on a stud of a body panel (not shown in the drawing). The pipes P are thus held in the holding spaces S.

According to the first embodiment of the present invention, the clamp body 10 and the rubber body 30 can be formed by an ordinary injection molding machine. Because of this, a special molding machine for dichroic or insert molding and a die are not necessary. Non-special molding equipment and dies turn out to be cheaper. The components of the vibration-proof clamp 1 are two: the clamp body 10 and rubber member 30. The clamp body 10 and rubber member 30 can be easily assembled by hand. As a result, the cost of the vibration-proof clamp 1 is low.

The pipe P does not directly contact the clamp body 10, and between the pipe P and the clamp body 10, a rubber member 30 is interposed at any portion of space therebetween. The rubber member 30 is of sufficient thickness to insure sufficient resistance to vibration. Thus, a vibration-proof clamp with a high degree of resistance to vibration can be obtained.

Rubber holding members 35 of the rubber member 30 are interposed between the pipe P and the elastic holding members 15. The rubber holding members 35 abut the elastic holding members 15 underneath. Since the protrusions 16 of the clamp body 10 engage the protrusion holes 36 of the rubber member 30, the rubber holding members 35 do not move down vis-à-vis the elastic holding members 15, even when the pipe 10 is inserted automatically. The rubber member 30 can support the mounting of the pipe P. Thus, it is able to maintain its pipe-holding capability just as well as can a pipe clamp that is not vibration-proof.

Figure 24:
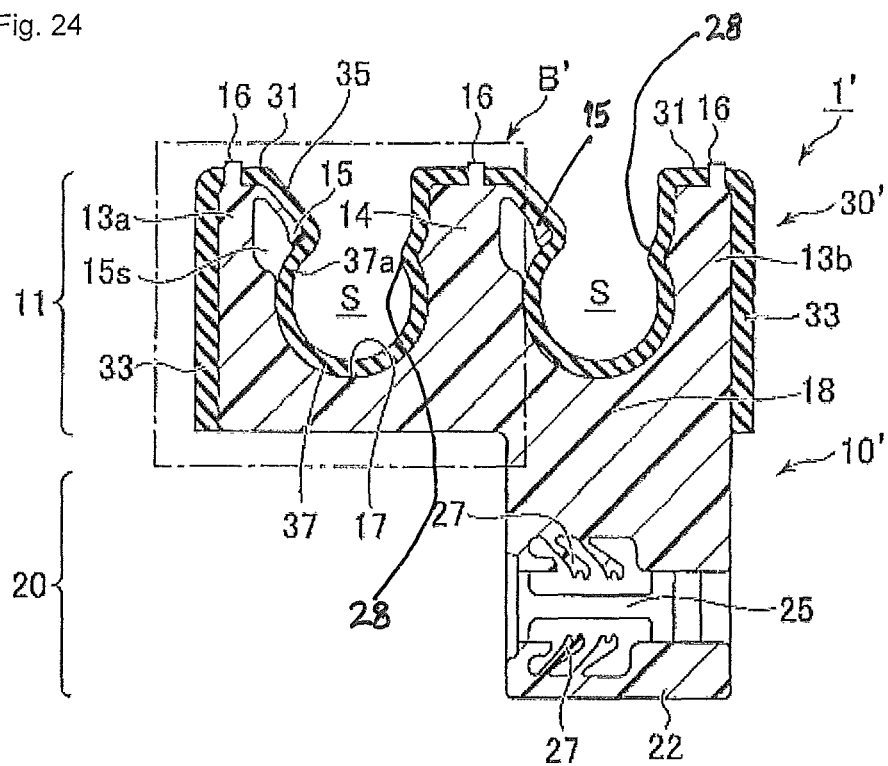
FIG. 24 is a cross-sectional view of a second embodiment of the vibration-proof clamp of the present invention.
Figure 25:
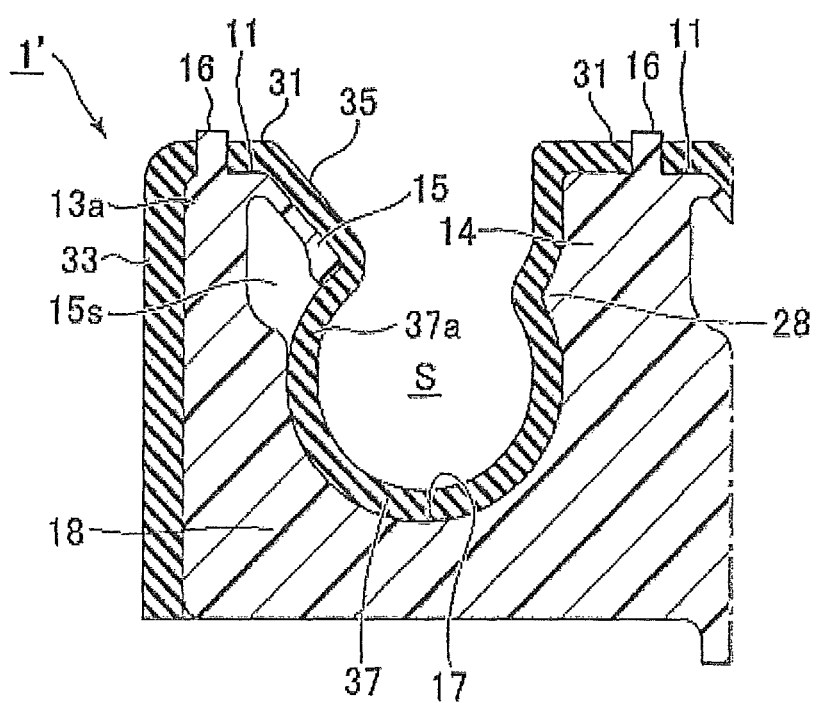
FIG. 25 is an enlarged cross-sectional view of part B' of FIG. 24.

Next, a vibration-proof clamp 1' of a second embodiment of the present invention will be described. FIG. 24 is a cross-sectional view of the vibration-proof clamp 1'. FIG. 25 is an enlarged cross-sectional view of the B' part of FIG. 24. The vibration-proof clamp 1' of the second embodiment has just one elastic holding member 15 that extends slanting downward towards one holding space S, instead of a pair, and just on one side of the one holding space S. On the side that does not have an elastic holding member 15, a bulge 28 is formed, and the rubber member 30' covers the side of the end wall 13b along the bulge 28 or the side of the central wall 14. In other points, it is the same as the vibration-proof clamp 1 of the first embodiment. The elastic holding member 15 may be formed on either the right or left side of the holding space S.

Referring to FIGS. 24 and 25, of the two holding spaces S, the left side holding space S has an elastic holding member 15 that extends slanting downward towards the holding space S from the top of the left side end wall 13a of the holding space S. There is no elastic holding member that extends slanting downward towards the holding space S from the top of the central wall 14 of the right side of the holding space S, and a holding space 15s is also not formed there. On the central wall 14 at roughly the same height as the elastic holding member 15, a bulge 28 is formed. The bulge 28 has a holding action so the pipe P does not escape. The rubber holding member 35 of the rubber member 30' is in contact with the left side elastic holding member 15 of the left side of the holding space S. Between the rubber curved part 37 and the rubber holding member 35 is a rubber curved extension part 37a. On the right side of the holding space S, the rubber member 30' is in contact with the side of the central wall 14 and the bulge 28.

For the right side holding space S, an elastic holding member 15 extends slanting downward towards the holding space S from the top of the central wall 14 on the left side of the holding space S. There is no elastic holding member that extends slanting downward toward the holding space S from the top of the end wall 13b on the right side of the holding space S, but a bulge 28 is formed there. The rubber holding member 35 of the rubber member 30' is in contact with the elastic holding member 15 on the left side of the right side holding space S. Between the rubber curved part 37 and the rubber holding member 35 is a rubber curved extension part 37a. On the right side of the holding space S, the rubber member 30' is in contact with the side of the end wall 13b and the bulge 28.

In the assembly of the vibration-proof clamp 1', the rubber body 30' is mounted on the clamp body 10' in a manner similar to that described with respect to the first embodiment of the present invention. When a pipe P is mounted in the holding space S of the vibration-proof clamp 1', the pipe P will be inserted from the top of the vibration-proof clamp 1'. The rubber holding member 35 and elastic holding member 15 on the same side are pressed by the pipe P, it enters the holding space 15s, and the pipe P can be inserted into the holding space S. When the pipe P enters into the holding space S, the rubber holding member 35 and elastic holding member 15 return to the positions shown in FIGS. 24 and 25. The pipe P is pressed slanting from above by the rubber holding member 35 and elastic holding member 15 and, pressed also by the bulge 28, it is prevented from escaping.

The same effect can be obtained with the second embodiment of the present invention as with the first embodiment. With one elastic holding member 15 for one holding space, a pipe P can still be held with stability. Because of the one elastic holding member 15 in the one holding space, the clamp can become smaller and the pipe space narrower. Because of the simple construction, manufacture will be inexpensive.

It will be appreciated by persons skilled in the art that the above embodiments have been described by way of example only, and not in any limitative sense, and that various alterations and modifications are possible without departure from the scope of the present invention as defined by the appended claims.

What is claimed is:

1. A vibration-proof clamp for holding an elongated member, comprising:
   a clamp body made of hard resin and including a holding part and an engaging part;
   the holding part defining a holding space in which the elongated member may be disposed;
   the holding part including a first end wall, and a curved wall adjacent the first end wall for holding the elongated member from below;
   the holding part further including an elastic holding member extending in a downwardly slanting direction from the first end wall towards the holding space to hold the elongated member from above;
   the engaging part being operative to connect the holding part with an attaching member; and further comprising:
   a resilient part defining a bottom aperture and being operative to cover the holding part via the aperture so that the elongated member and the clamp body are not in direct contact;
   the resilient part including a curved part that covers the curved wall of the holding part;
   the resilient part further including a resilient holding member that covers the elastic holding member, and a resilient curved extension part;
   the resilient curved extension part curving upwardly from the resilient curved part along the outside of the elongated member to the resilient holding member, when the elongated member is inserted in the holding space; whereby
   except for the aperture of the resilient part, the holding part is completely covered by the resilient part.

2. The vibration-proof clamp of claim 1, wherein the resilient part is a one-piece unitary rubber member that conforms to the shape of the holding part.

3. The vibration-proof clamp of claim 1, wherein the resilient part is a one-piece unitary soft resin member that conforms to the shape of the holding part.

4. The vibration-proof clamp of claim 1, wherein the resilient part is a one-piece unitary member that is adapted to be manually stretched over the holding part.

5. The vibration-proof clamp of claim 1, wherein:
   the elastic holding member includes an underside;
   the holding member further defining a holding member space formed on the underside of the elastic holding member; whereby,
   when the elongated member is inserted into the holding space, the elastic holding member can bend inside the holding member space.

6. The vibration-proof clamp of claim 5, wherein:
   a pair of elastic holding members extend from the holding member slanting downward towards the holding space; and wherein
   the pair of elastic holding members can bend into respective holding member spaces.

7. The vibration-proof clamp of claim 1, wherein:
   the clamp body defines a top part on which is formed a protrusion;
   the resilient member defines a protrusion hole mating with the shape of the protrusion such that the protrusion is thereby seated in the protrusion hole; whereby,
   when the elongated member is inserted in the holding space, the resilient holding member of the resilient part is held so that it does not move in relation to the elastic holding member of the clamp body.

8. The vibration-proof clamp of claim 7, wherein:
   a plurality of protrusions being formed on the clamp body top part adjacent a plurality of elastic holding members; and wherein the protrusions are elongated rectangular bodies extending parallel to a plurality of holding spaces defined by the holding part, mating protrusion holes being elongated slots.

9. The vibration-proof clamp of claim 1, wherein:
the clamp body holding part defines a bottom part;
the holding part defines an engaging bar extending transversely along the clamp body on the bottom part;
the engaging bar defining two ends;
the resilient part including two side walls;
the resilient part side walls defining engaging bar holes mating with respective ends of the engaging bar, such that respective ends of the engaging bar are seated in the engaging bar holes; whereby
the resilient part is held so that it does not become detached from the clamp body.

10. The vibration-proof clamp of claim 9, wherein a plurality of engaging bars on the bottom part have ends which are seated in a respective plurality of engaging bar holes defined by the resilient part.

11. The vibration-proof clamp of claim 1, wherein:
the holding part includes a base; and wherein
the engaging part extends downwardly from a portion of the base.

12. The vibration-proof clamp of claim 11, wherein:
the holding part includes a second end wall;
the engaging part including an end wall coextensive with the holding part second end wall; and further comprising:
engagement claws disposed in the engaging part; wherein
the engaging part end wall defining a fastener aperture communicating with the engagement claws.

* * * * *